(12) United States Patent
Lee (10) Patent No.: US 8,867,562 B2
(45) Date of Patent: *Oct. 21, 2014

(54) METHOD AND APPARATUS FOR PERFORMING RANDOM ACCESS BASED ON DELAY DETERMINED BY NETWORK

(75) Inventor: Ki Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 184 days.

This patent is subject to a terminal disclaimer.

(21) Appl. No.: 13/457,133

(22) Filed: Apr. 26, 2012

(65) Prior Publication Data

US 2012/0275378 A1 Nov. 1, 2012

Related U.S. Application Data

(60) Provisional application No. 61/479,811, filed on Apr. 27, 2011.

(30) Foreign Application Priority Data

Apr. 26, 2012 (WO) ................ PCT/KR2012/003226

(51) Int. Cl.
| | |
|---|---|
| *H04L 12/413* | (2006.01) |
| *H04W 4/00* | (2009.01) |
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 27/28* | (2006.01) |
| *H04W 74/08* | (2009.01) |

(52) U.S. Cl.
CPC ............... *H04L 27/28* (2013.01); *H04W 74/08* (2013.01)
USPC ............ 370/448; 370/328; 370/338; 370/252

(58) Field of Classification Search
CPC .............................. H04W 74/00; H04W 72/00
USPC ......... 370/328, 329, 336, 252, 230, 311, 254, 370/330, 331, 338, 235, 236, 280, 448; 709/226, 231
See application file for complete search history.

(56) References Cited

U.S. PATENT DOCUMENTS

| | | | |
|---|---|---|---|
| 8,112,091 | B2 | 2/2012 | Chun et al. |
| 2006/0039281 | A1* | 2/2006 | Benveniste .................. 370/230 |

(Continued)

FOREIGN PATENT DOCUMENTS

| | | |
|---|---|---|
| EP | 2 086 276 A2 | 8/2009 |
| KR | 10-2007-0076374 A | 7/2007 |
| KR | 10-2007-0107619 A | 11/2007 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 9)", 3GPP TS 36.321 V9.2.0 (Mar. 2010).

*Primary Examiner* — Benjamin H Elliott, IV
*Assistant Examiner* — Eric Nowlin
(74) *Attorney, Agent, or Firm* — Birch, Stewart, Kolasch & Birch, LLP (57) ABSTRACT

A method for performing random access is provided. The method is performed for random access procedure based on a lower bound of back-off time and an upper bound of back-off time. Based on the proposed method, subsequent transmission of a random access preamble is determined by control information included in a random access response. The control information explicitly or implicitly indicates an upper bound and a lower bound of a back-off time value. An exact back-off time is selected from a uniform distribution between the lower bound and the upper bound.

10 Claims, 9 Drawing Sheets

(56) References Cited

U.S. PATENT DOCUMENTS

| | | | |
|---|---|---|---|
| 2009/0201798 A1* | 8/2009 | Lee et al. | 370/216 |
| 2009/0239545 A1 | 9/2009 | Lee et al. | |
| 2010/0128741 A1* | 5/2010 | Agiwal et al. | 370/471 |
| 2010/0238859 A1* | 9/2010 | Vukovic et al. | 370/328 |
| 2010/0254345 A1* | 10/2010 | Raravi et al. | 370/331 |

* cited by examiner

FIG. 9

METHOD AND APPARATUS FOR PERFORMING RANDOM ACCESS BASED ON DELAY DETERMINED BY NETWORK

CROSS-REFERENCE TO RELATED APPLICATIONS

The present application for patent claims priority to Provisional Application No. 61/479,811 filed on Apr. 27, 2011, and International Application No. PCT/KR2012/003226 filed on Apr. 26, 2012, which are incorporated by reference in their entirety herein.

BACKGROUND OF THE INVENTION

1. Field of the Invention

The technical features of this document relate to wireless communications using a number of orthogonal frequency division multiple (OFDM) symbols, and more particularly, to a method and apparatus for processing a radio signal associated with a random access procedure.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

Machine to machine (M2M) communication is the communication between machines that do not necessarily need human intervention. The 3GPP has started an effort to determine potential network optimizations that could lower the operational costs associated with offering these new M2M services.

SUMMARY OF THE INVENTION

The technical features of this document provide a method of performing a random access procedure in a wireless communication system. The method is performed by a user equipment (UE).

In one aspect, the method comprises transmitting a first random access preamble to a base station (BS); receiving, in response to the first random access preamble, back-off interval information included in a random access response from the BS; and transmitting a second random access preamble to the BS. In the method, the transmission of the second random access preamble is delayed according to a back-off time value which is selected between a lower bound of the back-off time value and an upper bound of the back-off time value, and the lower bound of the back-off time value and the upper bound of the back-off time value are determined based on the back-off interval information. In the method, the lower bound of the back-off time value is non-zero. In the method, the back-off time value is randomly selected according to a uniform distribution between the lower bound of the back-off time value and the upper bound of the back-off time value.

The back-off interval information is included in a media access control (MAC) protocol data unit (PDU) of the random access response.

In the method, an indication field is included in a first sub-header of a MAC header, and the indication field indicates whether the lower bound of the back-off time is determined based on the upper bound of the back-off time value.

In the method, the first sub-header including the indication field and a back-off index value field consists of eight (8) bits, the back-off index value field indicates the upper bound of the back-off time value, the indication field consists of two (2) bits, and the back-off index value field directly following the indication field consists of three (3) bits.

In the method, the first sub-header including the indication field and a back-off index value field consists of eight (8) bits, the back-off index value field indicates the upper bound of the back-off time value, the indication field consists of three (3) bits, and the back-off index value field directly following the indication field consists of two (2) bits.

In the method, an indication field is included in a first sub-header of a MAC header, and the indication field indicates whether the lower bound of the back-off time is determined by a multiplication of a predetermined fraction and the upper bound of the back-off time which is determined based on the upper bound of the back-off time value.

In the method, the first sub-header including the indication field and a back-off index value field consists of eight (8) bits, the back-off index value field indicates the upper bound of the back-off time value, the indication field consists of two (2) bits, and the back-off index value field directly following the indication field consists of three (3) bits.

In the method, the first sub-header including the indication field and a back-off index value field consists of eight (8) bits, the back-off index value field indicates the upper bound of the back-off time value, the indication field consists of three (3) bits, and the back-off index value field directly following the indication field consists of two (2) bits.

In the method, a first sub-header and a second sub-header directly following the first sub-header are included in a MAC header of the MAC PDU.

In the method, the lower bound of the back-off time value is determined according to a first information field included in the first sub-header and a second information field included in the second sub-header, and the upper bound of the back-off time value is determined according to a first information field included in the first sub-header and a second information field included in the second sub-header.

In another design, a user equipment (UE) in a wireless communication system using a number of orthogonal frequency division multiplexing (OFDM) symbols is further provided. The UE comprises a processor configured for: transmitting a first random access preamble to a base station (BS); receiving, in response to the first random access preamble, back-off interval information included in a random access response from the BS; and transmitting a second random access preamble to the BS. In the UE, the transmission of the second random access preamble is delayed according to a back-off time value which is selected between a lower bound of the back-off time value and an upper bound of the back-off time value, and the lower bound of the back-off time value and the upper bound of the back-off time value are determined based on the back-off interval information. In the UE, the lower bound of the back-off time value is non-zero. In the UE, the back-off time value is randomly selected according to a uniform distribution between the lower bound of the back-off time value and the upper bound of the back-off time value.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

For clarity of explanation, the following description will focus on the 3GPP LTE and its evolution. However, the technical features of this description are not limited thereto.

Figure 1:
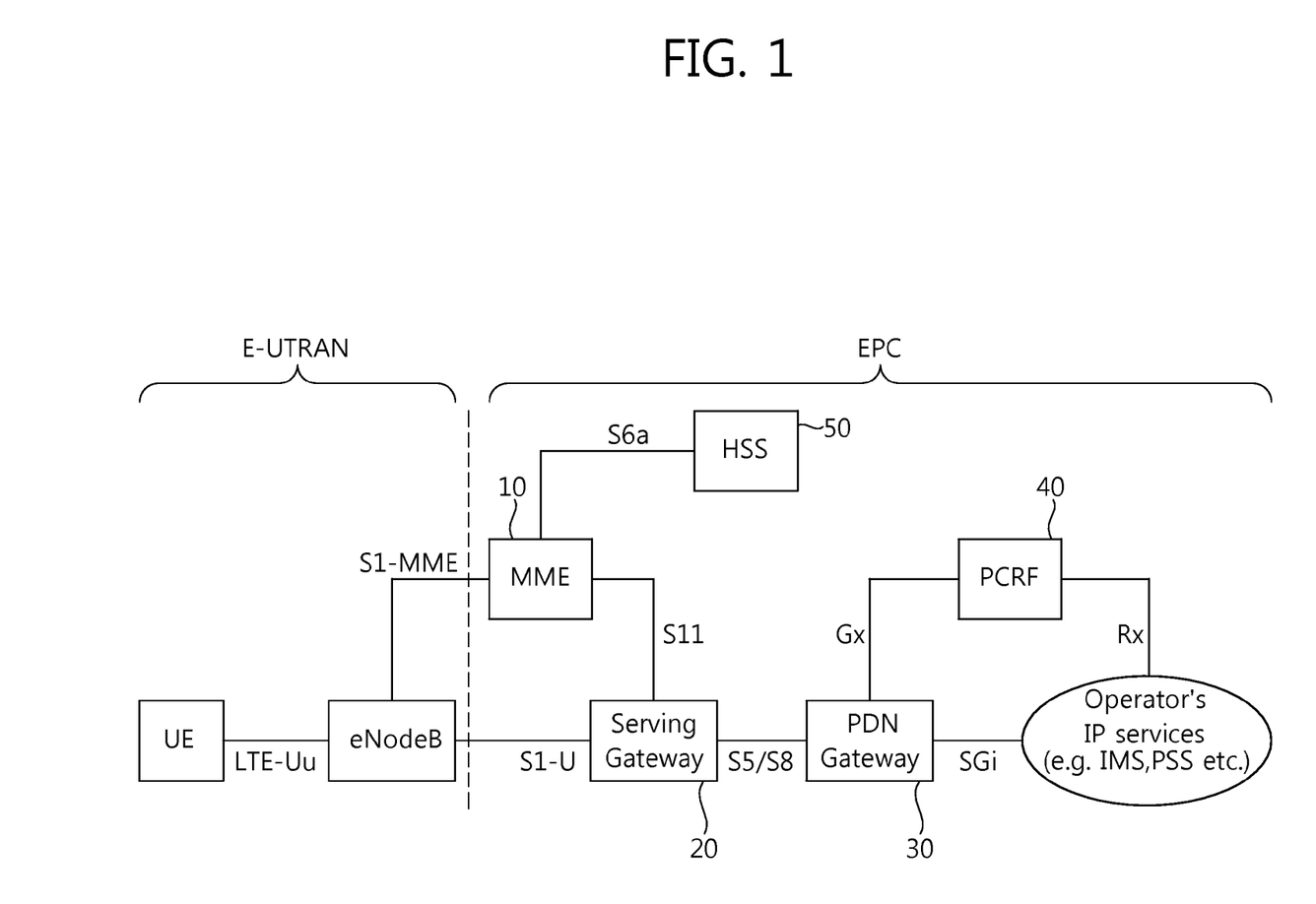
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of "EPS bearers" to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE. When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits a paging message to all base stations (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

Figure 2:
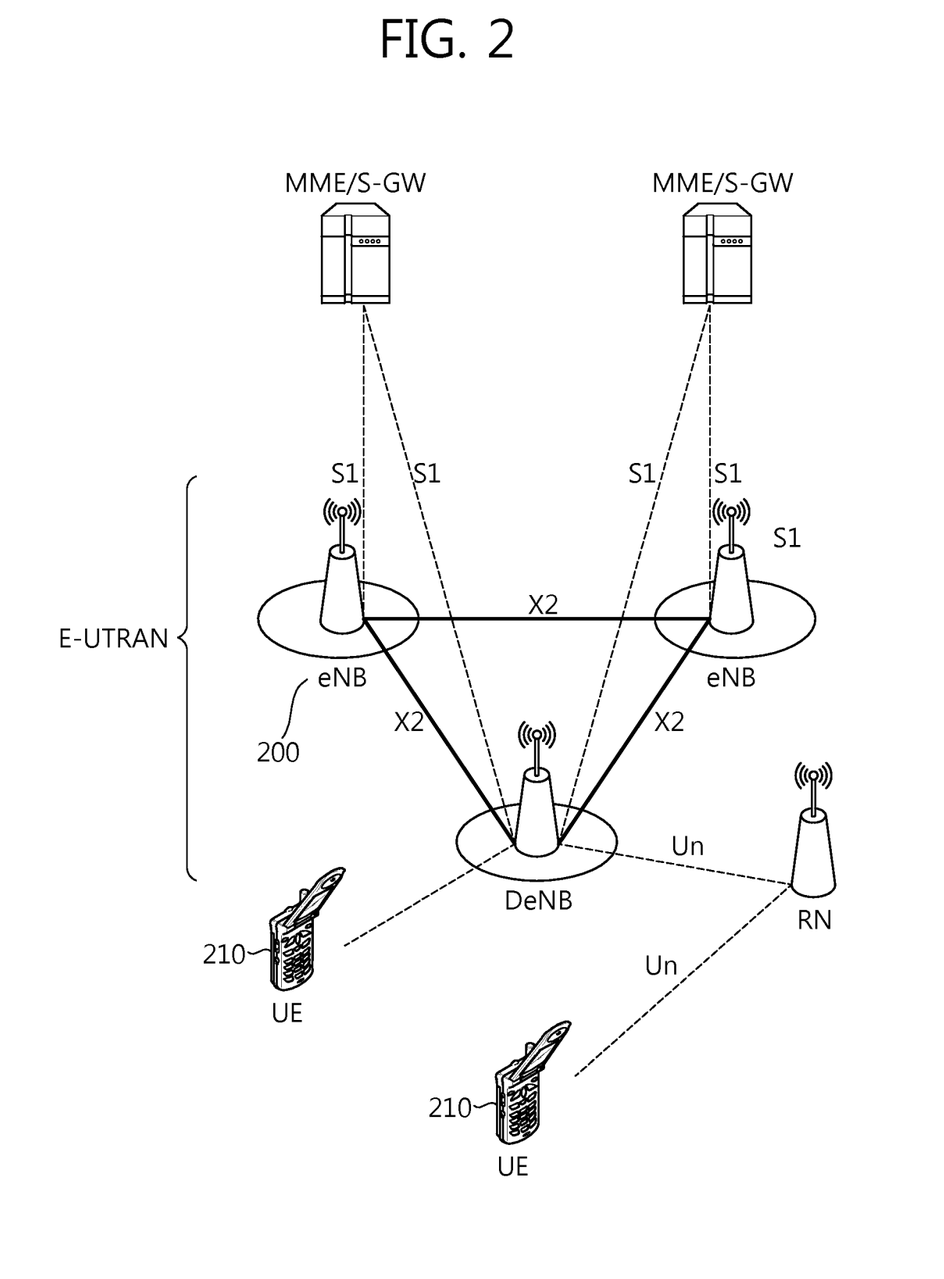
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MME) by means of the S1-MME and to the Serving Gateway (S-GW) by means of the S1-U.

Further, the E-UTRAN can additionally provide relay functionality. The E-UTRAN can includes a Donor eNB (DeNB) that provides at least one Relay Node (RN), with access to the core network. Between the DeNB and RN, an Un interface is defined, whereas an Uu interface is further defined between the RN and the UE.

As discussed above, the machine to machine (M2M) communication is the communication between machines that do not necessarily need human intervention, and the 3GPP has started an effort to determine potential network optimizations. The M2M communication, which is also referred to as machine type communication (MTC), is expected to have applications in areas, such as smart metering, home automation, e-Health, fleet management, etc.

M2M communications have a number of unique characteristics which may be used to optimize the usage of the operator network. These characteristics include, for example: mostly data-centric communication (voice not expected), a potentially large number of communicating terminals, a low traffic volume per terminal, a potentially low mobility for some devices, and potentially power-limited devices.

Hereinafter, a method and apparatus for performing random access are provided in detail. The following description provides a method and apparatus for a performing random access procedure based on a lower bound of back-off time and an upper bound of back-off time. Based on the proposed method, subsequent transmission of a random access preamble is determined by control information included in a random access response. The control information explicitly or implicitly indicates an upper bound and a lower bound of a back-off time value. An exact back-off time is selected from a uniform distribution between the lower bound and the upper bound.

The random access procedure can be initiated with an Access Class (AC) barring. In 3GPP, each UE belongs to an AC in the range 0-9. In addition, some UEs may belong to one or more high priority ACs in the range 11-15, which are reserved for specific uses, e.g., security services, public utilities, PLMN staff, etc. AC 10 is used for emergency access.

The UE checks if access is barred for all its applicable ACs, and relevant control information is transmitted via SystemInformationBlockType2 (SIB2). SIB2 may include a set of AC barring parameter for Mobile Originated (MO) calls and/or MO signaling. This set of parameters comprises a probability factor and a barring timer for ACs 0-9 and a list of barring bits for ACs 11-15. For ACs 0-9, if the UE initiates an MO call and the relevant parameters are included, the UE draws a random number. If the drawn number exceeds the probability factor, access is not barred. Otherwise access is barred for a duration which is randomly selected based on the broadcasted barring timer value. For ACs 11-15, if the UE initiates an MO call and the relevant AC barring parameters are included, access is barred whenever the bit corresponding to all of the UE's AC is set. The behavior is similar in the case of UE-initiated MO signaling.

Figure 3:
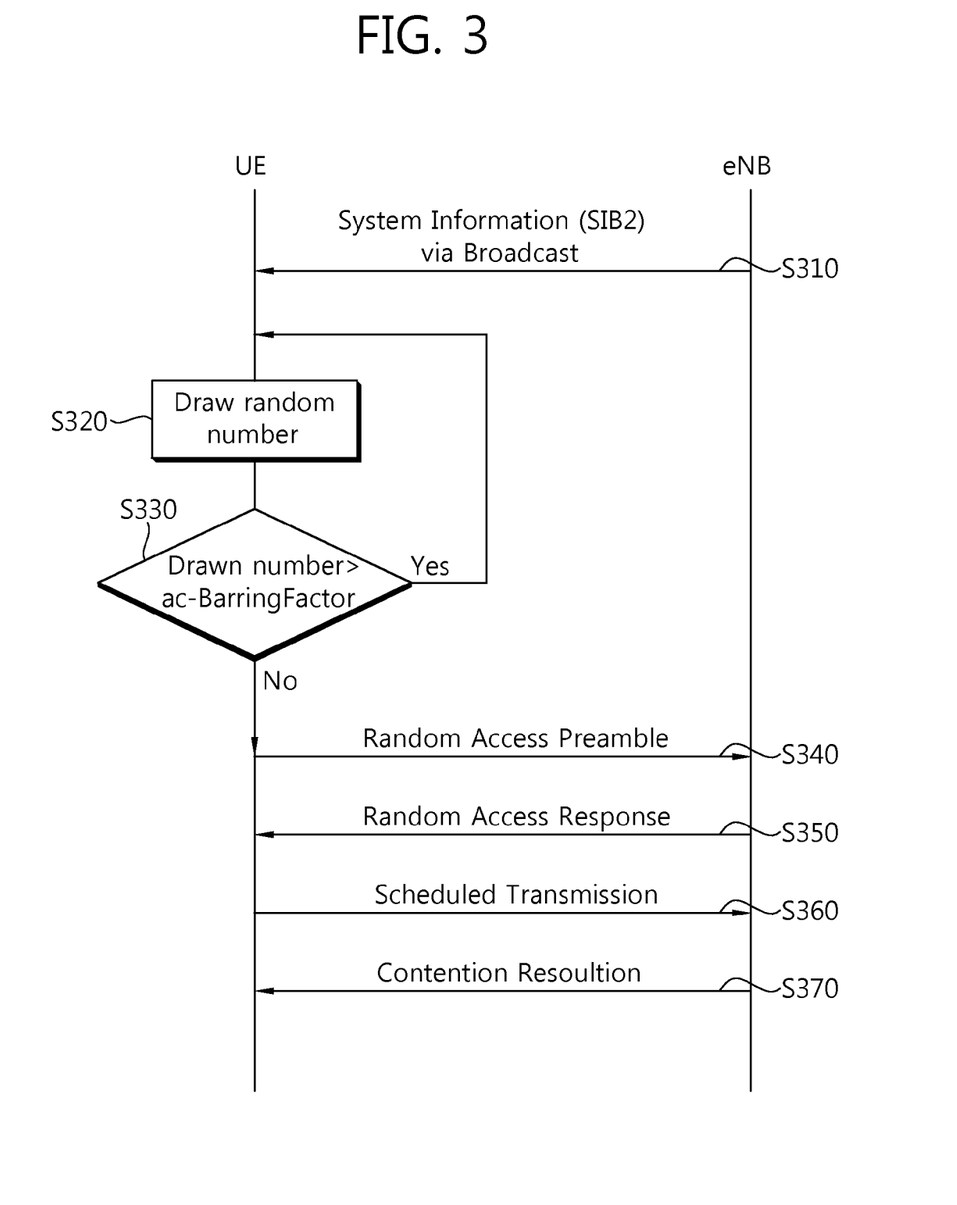
FIG. 3 is a flow diagram showing a random access procedure which is used for an embodiment of the proposed method.

FIG. 3 is a flow diagram showing a random access procedure which is used for an embodiment of the proposed method.

In order to obtain new connection (e.g., a data connection or signaling connection) UEs should first perform a RA procedure and this is a common feature in most cellular system. Further, the RA procedure can be categorized into contention-based and contention-free. The example depicted in FIG. 3 is directed to the contention-based RA procedure.

Referring to FIG. 3, in step S310, the relevant parameters are transmitted from a base station (e.g., eNB). Various control information can be broadcasted via 'System information', such as Master Information Block (MIB) and System Information Block type k (k=1, 2, . . . ), and the relevant parameters associated with the AC barring are broadcasted via SIB2, as discussed above. As explained above, SIB2 provides information for UEs how they perform the RA procedure. The SIB2 further includes a value for 'ac-BarringFactor', which indicates the probability that a certain UE is supposed to be prevented from attempting the RA procedure to a certain cell. In case of an ordinary call (i.e., MO data call), in step S320, the UE shall draw a random number from a uniform distribution (0,1). If the random number drawn is less than the 'ac-BarringFactor', the UE performs subsequent steps of the RA procedure (S330).

Referring to FIG. 3, in step S340, a UE selects a particular random access preamble and certain Random Access Channel (RACH) resources from an available random access preamble set and RACH resources, and transmits the selected random access preamble on the selected RACH to an eNB.

In step S350, the eNB receives the random access preamble, and then transmits a random access response to the UE. The random access response includes information on a back-off time to be described below. Further, the random access response includes a time advance (TA) and uplink radio resource allocation information for the transfer of a scheduled message, and also includes an index of the received random access response so that the UE can determine whether the random access response is for the UE. The random access response transmitted on a DL-SCH (downlink-shared channel) may be specified by a DL L1/L2 (downlink layer 1/layer 2) control channel indicated by a random access-radio network temporary identity (RA-RNTI).

In step S360, the UE receives the random access response, and then transmits the scheduled message according to the radio resource allocation information included in the random access response. The scheduled message, which is also referred to as a message 3, may include an RRC connection request message.

In step S370, the BS receives the scheduled message from the UE, and then transmits a contention resolution message, which is also referred to as a message 4, to the UE. In order to check whether contention occurs with respect to the message 3, a contention resolution timer is initiated after transmitting the message 3. If the message 4 is not successfully received until the contention resolution timer expires, step 370 may be repeated based on predefined configuration.

After the RRC connection request message is accepted by the network, an RRC connection can be successfully established and the UE enters an RRC connected mode. However, the RRC connection request may be rejected, and the UE may thereafter receive an 'RCConnectionReject' message from the eNB. Further, the UE may consider that the RRC connection requested is regarded as rejected without explicitly receiving the 'RRCConnectionReject' when the contention resolution timer expires without receiving the message 4. In these cases, a wait time can be applied before performing the AC barring to avoid the large number of UE-initiated call attempts. In particular, a UE is required to avoid a subsequent AC barring during the wait time, which is indicated by the network.

Hereinafter, the problems of mechanism related to a random access procedure are further described.

In 3GPP LTE, the support of MTC (or M2M) nodes, or interchangeably delay-tolerant access or low priority access, requires very efficient operating mechanisms and protocols for the traffic channel and random access channel.

In the current standard, a UE starts a contention-based random access procedure with the AC barring and then, if not barred, the UE prepares for preamble transmission (such as resource selection, preamble selection, transmit power level determination, and so on) as disclosed in FIG. 3. After transmitting the preamble, a MAC sub-layer of the UE monitors a Physical Downlink Control Channel (PDCCH) for a possible random access response until the contention solution timer expires. If a possible random access response with the transmitted preamble information is received by the UE, one of the UE's tasks is to read or obtain information on back-off interval (BI) from a header of a MAC PDU included in the random access response for the UE. After transmitting a message 3 (i.e., scheduled transmission), if there is no contention resolution, the UE will randomly choose a wait-time value for the back-off before it retries for preamble (re-)transmission.

Based on the current standard, the UE receives or reads the BI index (i.e., BI value) in the received MAC PDU header, performs a random draw from a uniform distribution [0, BI value], and waits for the selected period of time before re-transmission of the random access preamble. Namely, the UE is designed to draw a value from zero (0), which can prevent the UE from choosing a small value for the back-off procedure, thereby decreasing throughput for each traffic load as described below.

One of features of present disclosure is to allow a UE to choose a random value from a uniform distribution with a lower bound (LB) that can be set to non-zero. In other words, the concept of 'exclusive' back-off is introduced to the proposed method, so that the UE does not choose a small value for the back-off operation. In one design, to provide information on the lower bound, two types of signaling can be defined, i.e., explicit signaling and implicit signaling.

Based on the proposed method, the UE performs a random draw from [LB, a received value (i.e., a value indicated by BI field in the random response message)], thereby using the drawn number as a back-off value for the back-off procedure. In particular, the back-off value can be selected based on a uniform distribution.

Hereinafter, the explicit signaling is explained. When the explicit signaling is used to indicate the LB, the eNB may transmit a value explicitly indicating the LB or an implied value of an intended LB (e.g., various indications, such as a ratio or delta for UE to calculate with). Examples of the explicit signaling include Method 1 in which the LB and the BI value are explicitly specified and Method 2 in which the LB is specified as a ratio with respect to the BI value. For instance, based on Method 2, the LB (e.g., 480 ms) can be defined by using a fraction (e.g., 0.5) and the BI value (e.g., 960 ms).

Method 1 and Method 2 can be implemented in various ways. For example, a field related to the signaling can be defined in MAC PDU of the random access response. The newly-defined field is referred to as an 'F' field. In other words, Method 1 and Method 2 can be implemented by designing the F field in various ways.

Figure 4:
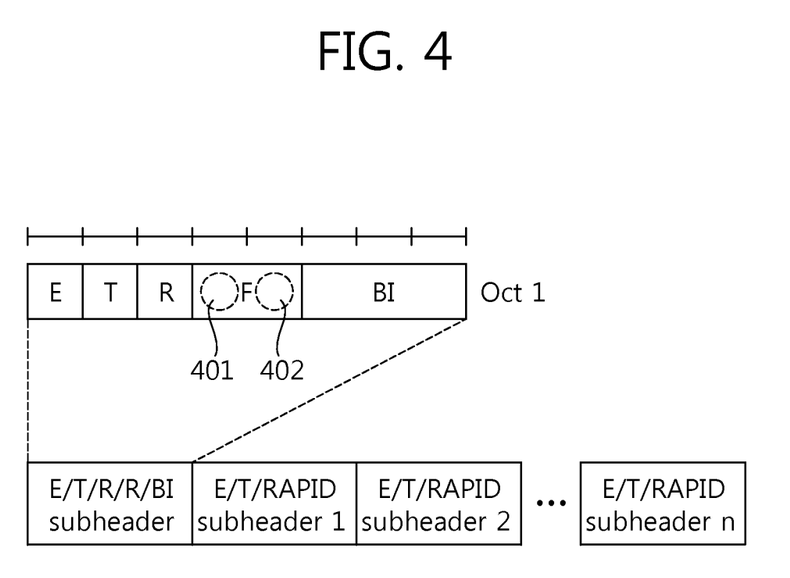
FIG. 4 is a block diagram showing a structure of the MAC PDU based on Option 1 of the proposed method.

The length of the F field has two options, i.e., Option 1 and Option 2, which can be used separately or concurrently. In both options, the first bit of the F field can be used for special purpose; the second bit in Option 1 (or third in Option 2) can be used to express a fraction or value for UE to calculate the LB. The usage (fraction or value in Option 1 or Option 2) can be predetermined between UE and the network. FIG. 4 is a block diagram showing a structure of the MAC PDU based on Option 1 of the proposed method.

In Option 1, various designs of F field can be provided. In particular, Option 1 provides a sub-header which is modified from a conventional E/T/R/R/BI sub-header including two bits of the F field and three bits of BI field. Referring to FIG. 4, one example of Option 1 can be used when the first bit of the F field 401 is set to 'on', e.g., '1' to or '0'. Based on the above example of Option 1, three bits in a BI field indicate the LB. Therefore, the above example of Option 1 belongs to Method 1, since the LB and the BI are explicitly indicated.

Three bits in the BI field of FIG. 4 can explicitly indicate the LB as shown in table 1 below:

TABLE 1

| BI (bits) | LB (when first bit of F filed is on) |
|---|---|
| 000 | $1^{st}$ predetermined LB time value |
| ... | |
| 111 | $8^{th}$ predetermined LB time value |

Referring to Table 1, when the received BI is '111', the LB can be set to the $8^{th}$ predetermined time value for the LB.

In another example of Option 1, a predetermined fraction is used for determining the LB. The example using the predetermined fraction can be used when the second bit of the F 402 is set to 'on', e.g., '1' or '0'. For instance, the predetermined fraction can be set to '½', and the second bit of the F 402 is set to '1'. In this case, the UE can calculate the LB by multiplying a time value which is indicated by 3 BI bits (e.g., 10-sec) and the determined fraction (e.g., ½). Namely, the LB is determined to be 5 seconds (i.e., 0.5×10-sec). In the meantime, said another example of Option 2 also belongs to Method 1, since the LB and the BI are explicitly indicated.

Figure 5:
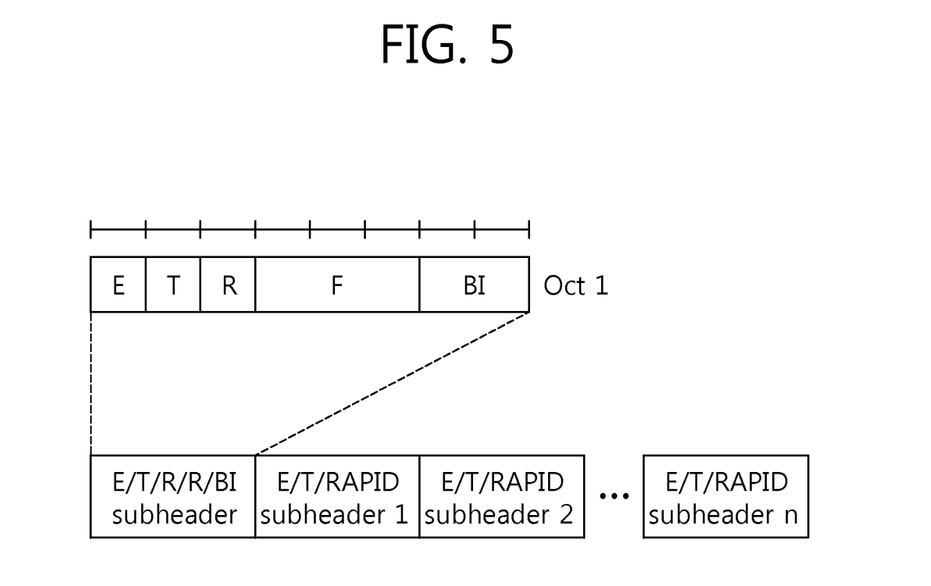
FIG. 5 is a block diagram showing structure of the MAC PDU based on Option 2 of the proposed method.

FIG. 5 is a block diagram showing structure of the MAC PDU based on Option 2 of the proposed method. In Option 2, three or more bits are allocated for the F field and two or less bits are allocated for the BI field in the newly-introduced sub-header. Namely, there are lesser BI bits but more F field bits for value or fraction indication. If a long BO field is used, using more bits for the F field and using lesser bits for F may yield comparable performance. Further, it is noted that if a RA-RNTI is not separated between MTC and human UE, this option may have a backward compatibility issue.

The proposed method further includes Option 3 in which an additional BI sub-header which follows an original sub-header is included. In other words, the additional BI sub-header is included after the original sub-header, and the newly included sub-header is identified by the use of 'reserved' bit(s), as the bit(s) specified 'F'.

Figure 6:
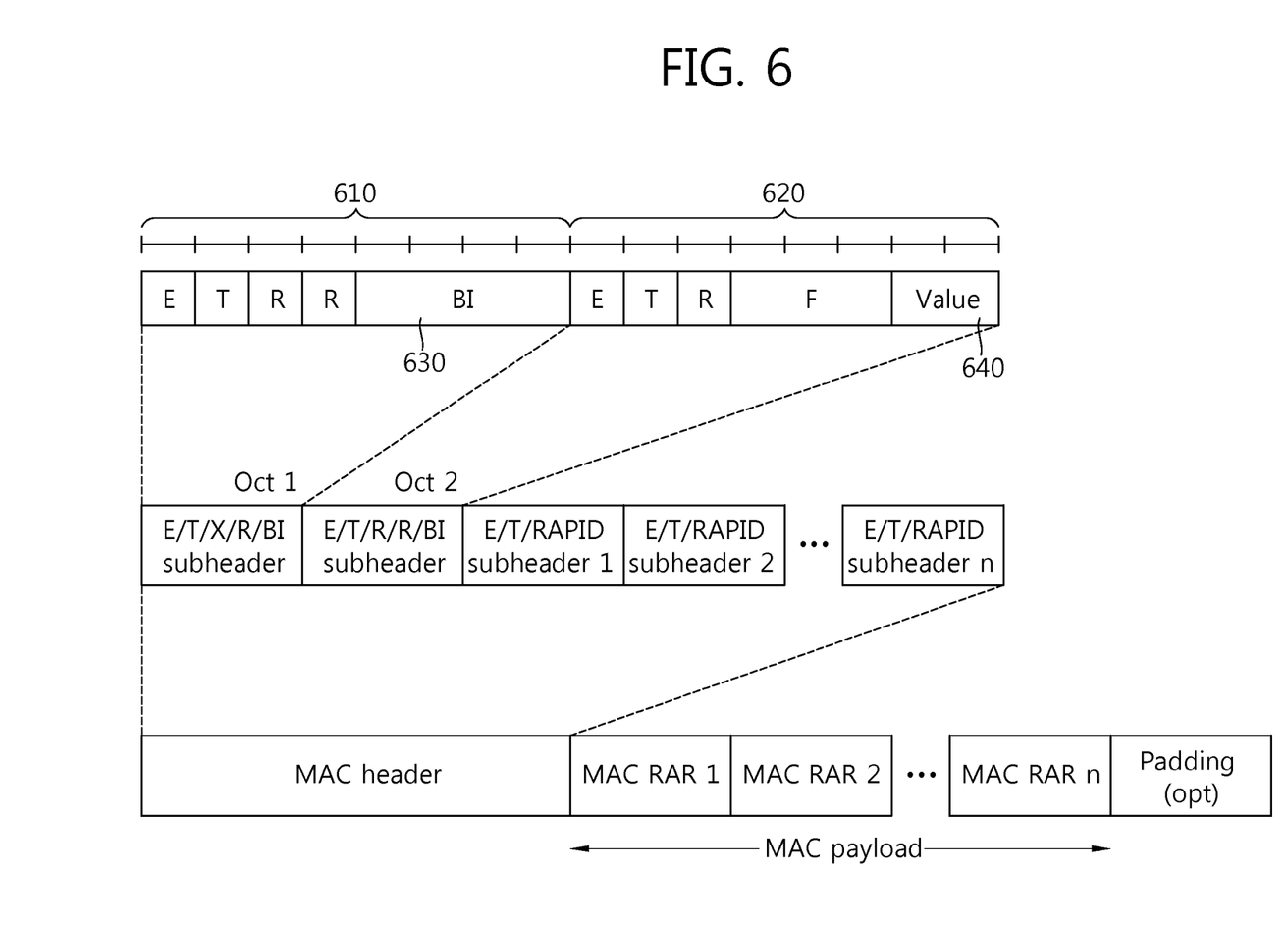
FIG. 6 is a block diagram showing structure of the MAC PDU based on Option 3 of the proposed method.

FIG. 6 is a block diagram showing structure of the MAC PDU based on Option 3 of the proposed method. As explained above, an additional sub-header 620 following an original sub-header 610 is included. Further, the additional sub-header 620 can be identified by bit(s) of F, as discussed above.

Upon receiving a sub-header depicted in FIG. 6, LB of back-off can be set to 'BI 630–Value 640' and UB (upper bound) can be set to 'BI 630+Value 640'.

As discussed above, an implicit signaling is also possible. In the implicit signaling, the eNB does not send additional information in the random access response. Namely, the eNB does not include the F filed in the random access response. In this case, the LB is indicated according to a predefined rule by using respective values indicated by the BI filed of the MAC PDU. For instance, a predefined mapping rule between the LB and the BI values is defined in the standard, and the UE determines the LB exclusively based on the value indicated by three bits BI field.

The example discussed above can be explained in the context of parameters used in Section 5.1.4 of 3GPP TS 36.321 as follows:

If no Random Access Response is received within the RA Response window, or if none of all received Random Access Responses contains a Random Access Preamble identifier corresponding to the transmitted Random Access Preamble, the Random Access Response reception is considered not successful and the UE shall:
  increment PREAMBLE_TRANSMISSION_COUNTER by 1;
  If PREAMBLE_TRANSMISSION_COUNTER= preambleTransMax+1:
    indicate a Random Access problem to upper layers.
  if in this Random Access procedure, the Random Access Preamble was selected by MAC:
    based on the backoff parameter in the UE, select a random backoff time according to a uniform distribution between "LB" and "UB" specified;
    delay the subsequent Random Access transmission by the backoff time;
  proceed to the selection of a Random Access Resource (see subclause 5.1.2).

Figure 7:
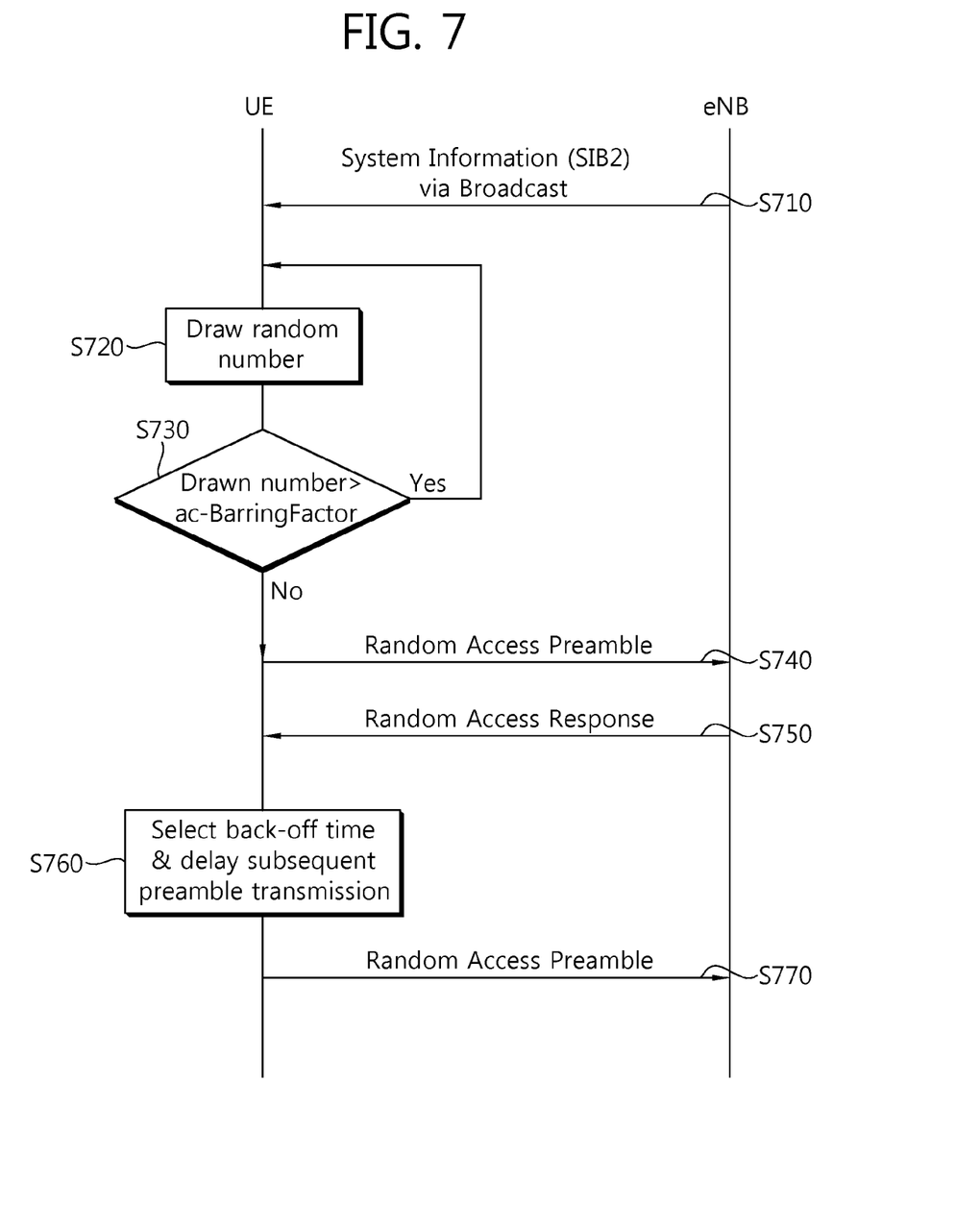
FIG. 7 is a flow diagram showing a random access procedure based on one embodiment of the proposed method.

FIG. 7 is a flow diagram showing a random access procedure based on one embodiment of the proposed method.

Referring to FIG. 7, in step S710, the relevant parameters are transmitted from a base station (e.g., eNB). In step S720, the UE draws a random number from a uniform distribution (0,1). If the random number drawn is less than the 'ac-BarringFactor', the UE performs subsequent steps of the RA procedure (S730).

In step S740, a UE selects a particular random access preamble and certain Random Access Channel (RACH) resources from an available random access preamble set and RACH resources, and transmits the selected random access preamble on the selected RACH to an eNB. In step S750, the eNB receives the random access preamble, and then transmits a random access response to the UE.

Upon receiving the random access response, in step S760, the UE determines the LB and the UB by using the above-explained signaling (i.e., explicit or implicit signaling), selects a back-off time from a uniform distribution between the LB and UB, and delays the subsequent preamble transmission. After the delay (or back-off), the UE may retry preamble (re-)transmission. In particular, in step S770, the UE selects a particular random access preamble, and transmits the selected random access preamble.

Figure 8:
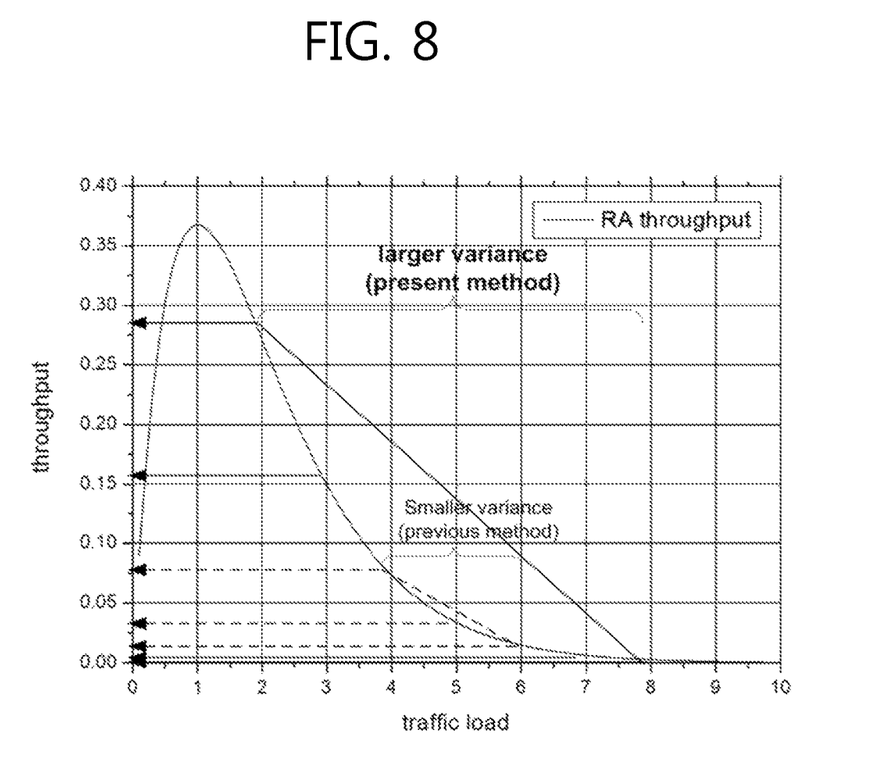
FIG. 8 shows technical effects of one embodiment of the proposed method.

FIG. 8 shows technical effects of one embodiment of the proposed method. In particular, FIG. 8 shows random access (RA) throughput, which represents normalized throughput associated with random access resources, with respect to each traffic load (i.e., discrete traffic load values). FIG. 8 demonstrates how much better throughput can be achieved by using one embodiment of the proposed method in which a lower bound of back-off time is further provided. As discussed above, the proposed method introduces the lower bound of back-off time which makes the load distribution uneven and the variance of traffic load larger. The following table shows an example of RA throughput with respect to each traffic load values, as depicted in FIG. 8.

TABLE 2

| Load | Throughput (%) |
|---|---|
| 2 | 27.07 |
| 3 | 14.94 |
| 4 | 7.33 |
| 5 | 3.37 |
| 6 | 1.49 |
| 7 | 0.64 |
| 8 | 0.27 |

The conventional method does not use the lower bound of back-off time and makes the variance of traffic load smaller. If the probability distribution has a smaller variance as depicted in FIG. 8, the expectation of random variable k (or traffic load) will be '5' and each variable will have the probability of '⅓'. In other words, probability distribution with a smaller variance can be represented as follows:

$$\text{Prob}(\text{Load}=k)=\tfrac{1}{3}, \text{ for } k=4, 5, 6 \text{ (with mean 5)} \qquad \text{[Equation 1]}$$

In this example, the average throughput will be approximately given by the following equation.

$$(\tfrac{1}{3})*\{7.33+3.37+1.49\}=4.06(\%). \qquad \text{[Equation 2]}$$

Unlike the above example associated with the conventional method, if the probability distribution has a larger variance, it can be represented as follows:

$$Prob(\text{Load}=k)=\tfrac{1}{7}, \text{ for } k=2,3,4,5,6,7,8 \text{ (with mean 5)}, \qquad \text{[Equation 3]}$$

Further, the average throughput associated with the proposed method will be approximately given by the following equation.

$$(\tfrac{1}{7})*\{27.07+14.94+7.33+3.37+1.49+0.64+0.27\}=7.87 (\%). \qquad \text{[Equation 4]}$$

The instant example demonstrates a substantial improvement in RA throughput that can be achieved by increasing the variance of the load distribution: {7.87−4.06}/4.06=93.84 (%). Namely, the RA throughput of the proposed method has a level of 193.84% in comparison to the throughput achievable by the use of the conventional method.

Figure 9:
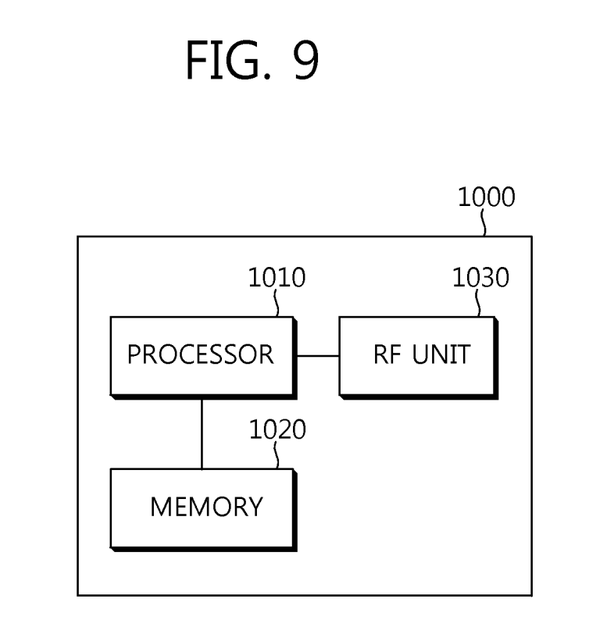
FIG. 9 is a block diagram showing a wireless apparatus to implement technical features of this description.

FIG. 9 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure related determining bound values for back-off. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, to of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of performing a random access procedure in a wireless communication system using a number of orthogonal frequency division multiplexing (OFDM) symbols, the method performed by a user equipment (UE) and comprising:
transmitting a first random access preamble to a base station (BS);
receiving, in response to the first random access preamble, back-off interval information included in a random access response from the BS;
determining a lower bound of a back-off time value and an upper bound of the back-off time value based on the back-off interval information; and
transmitting a second random access preamble to the BS,
wherein the transmission of the second random access preamble is delayed according to the back-off time value which is selected between the lower bound of the back-off time value and the upper bound of the back-off time value,
wherein the lower bound of the back-off time value is non-zero,
wherein the back-off time value is randomly selected according to a uniform distribution between the lower bound of the back-off time value and the upper bound of the back-off time value,
wherein the back-off interval information is included in a media access control (MAC) protocol data unit (PDU) of the random access response, and
wherein an indication field is included in a first sub-header of a MAC header, and the indication field indicates whether the lower bound of the back-off time value is determined by a multiplication of a predetermined fraction and the back-off interval information of the back-off time value which is determined based on the upper bound of the back-off time value.

2. The method of claim 1, wherein the first sub-header including the indication field and a back-off index value field consists of eight (8) bits, the back-off index value field indicates the upper bound of the back-off time value, the indication field consists of two (2) bits, and the back-off index value field directly following the indication field consists of three (3) bits.

3. The method of claim 1, wherein the first sub-header including the indication field and a back-off index value field consists of eight (8) bits, the back-off index value field indicates the upper bound of the back-off time value, the indication field consists of three (3) bits, and the back-off index value field directly following the indication field consists of two (2) bits.

4. The method of claim 1, wherein a second sub-header directly following the first sub-header is included in a MAC header of the MAC PDU.

5. The method of claim 4, wherein the lower bound and the upper bound of the back-off time value are determined according to a first information field included in the first sub-header and a second information field included in the second sub-header.

6. A user equipment (UE) in a wireless communication system using a number of orthogonal frequency division multiplexing (OFDM) symbols, the UE comprising:
a processor configured to:
transmit a first random access preamble to a base station (BS);
receive, in response to the first random access preamble, back-off interval information included in a random access response from the BS;
determine a lower bound of a back-off time value and an upper bound of the back-off time value based on the back-off interval information; and
transmit a second random access preamble to the BS,
wherein the transmission of the second random access preamble is delayed according to the back-off time value which is selected between the lower bound of the back-off time value and the upper bound of the back-off time value, wherein the lower bound of the back-off time value is non-zero, wherein the back-off time value is randomly selected according to a uniform distribution between the lower bound of the back-off time value and the upper bound of the back-off time value, wherein the back-off interval information is included in a media access control (MAC) protocol data unit (PDU) of the random access response, and wherein an indication field is included in a first sub-header of a MAC header, and the indication field indicates whether the lower bound of the back-off time is determined by a multiplication of a predetermined fraction and the back-off interval information of the back-off time which is determined based on the upper bound of the back-off time value.

7. The user equipment of claim 6, wherein the first sub-header including the indication field and a back-off index value field consists of eight (8) bits, the back-off index value field indicates the upper bound of the back-off time value, the indication field consists of two (2) bits, and the back-off index value field directly following the indication field consists of three (3) bits.

8. The user equipment of claim 6, wherein the first sub-header including the indication field and a back-off index value field consists of eight (8) bits, the back-off index value field indicates the upper bound of the back-off time value, the indication field consists of three (3) bits, and the back-off index value field directly following the indication field consists of two (2) bits.

9. The user equipment of claim 6, wherein a second sub-header directly following the first sub-header is included in a MAC header of the MAC PDU.

10. The user equipment of claim 9, wherein the lower bound and the upper bound of the back-off time value are determined according to a first information field included in the first sub-header and a second information field included in the second sub-header.

* * * * *